Dec. 21, 1954   J. J. ZENKER ET AL   2,697,294
PASTRY DUMMY
Filed June 20, 1951   2 Sheets-Sheet 1
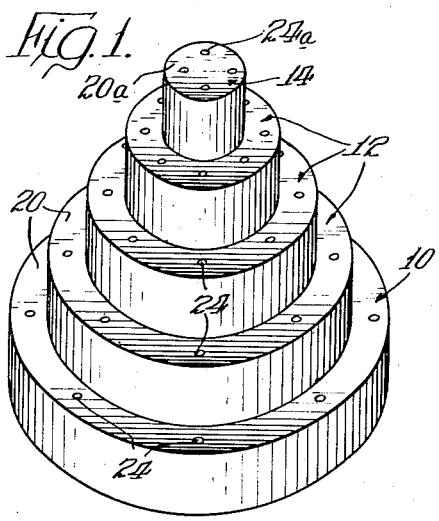
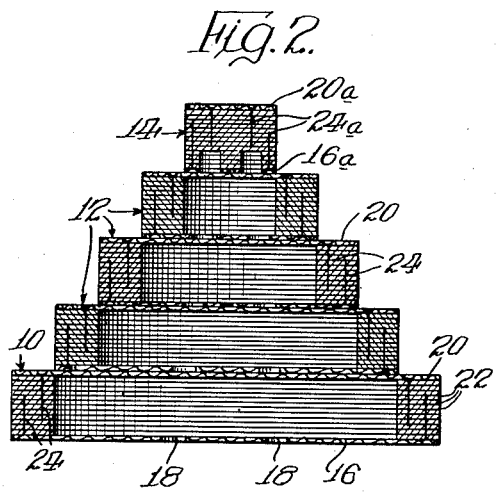
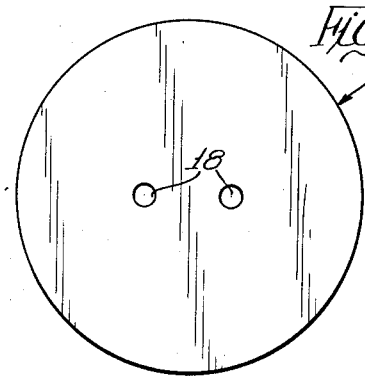
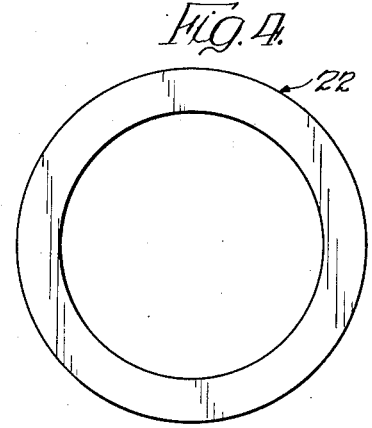
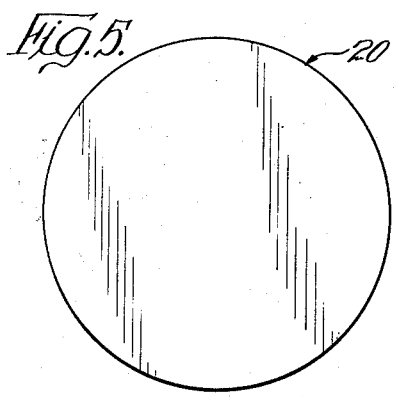
INVENTORS.
Gottfried J. Zenker
BY John J. Zenker
Attys.

Dec. 21, 1954 — J. J. ZENKER ET AL — 2,697,294
PASTRY DUMMY
Filed June 20, 1951 — 2 Sheets-Sheet 2
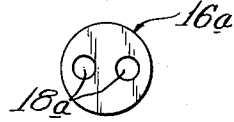
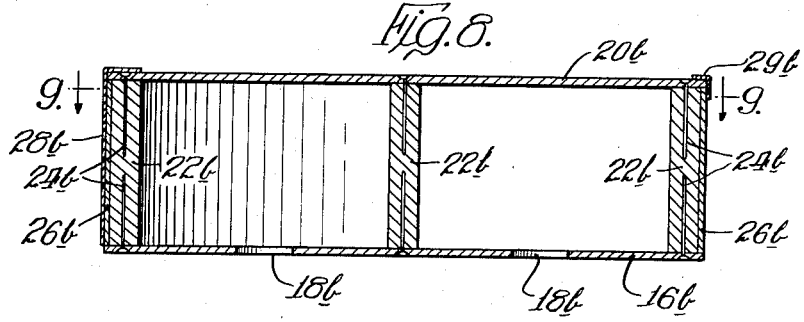
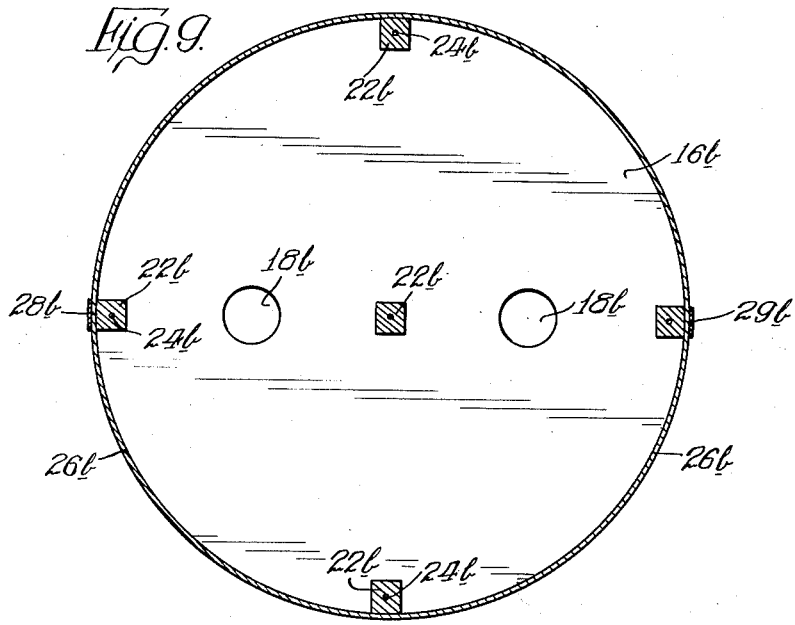
INVENTORS.
Gottfried J. Zenker
BY John J. Zenker

United States Patent Office 2,697,294
Patented Dec. 21, 1954

2,697,294

PASTRY DUMMY

John J. Zenker, Chicago, and Gottfried J. Zenker, Oak Park, Ill.

Application June 20, 1951, Serial No. 232,613

2 Claims. (Cl. 40—126)

The present invention relates to pastry dummies and, more particularly, to mock cake forms to which icing, frosting, or simulated frostings may be applied to provide imitation cakes and the like for display purposes.

Bakers, to display their art and abilities, have long resorted to featuring a cake of somewhat monumental proportions in the display windows of their shops. The displayed cakes appear to be genuine, yet it will be appreciated that a substantial waste of ingredients would result if the cakes were real, since cakes of the general type are not readily sold and, in fact, are only made upon special order, such as for wedding celebrations. Therefore, for display purposes, bakers have applied frosting and fanciful frosting designs to mock cake forms of wood, paper, wire and the like. In many instances, materials having the consistency and appearance of frosting, such as plaster of Paris, are utilized to simulate genuine frosting, and the resulting display cake is actually composed of entirely non-edible "ingredients" and can be used for display purposes over a long period of time.

In addition to display purposes, cake dummies are used in the formation of mock layers or tiers for genuine cakes. For example, to meet the food demands for a particular celebration, four pounds of cake may be required. A four-pound cake may be only a two layer or two tier cake and, as such, would not portray the character essential to the festive cake of the celebration, such as a wedding cake. To increase the apparent size or proportions of the cake to meet the social demands of the occasion, mock layers are provided at the bottom of the cake and merely covered with frosting so as to enable the cake to play its intended part in the celebration.

To apply frosting to a cake, whether real or imitation, a baker holds the cake, or a layer thereof, in one hand and applies frosting to those surfaces of the cake that will be exposed when the cake is completed. For example, in forming a wedding cake consisting of a number of tiers or layers, the baker applies frosting, in the manner described, to the periphery and sometimes the upper surface of the bottom layer or tier of the cake and then places that layer upon a flat surface or platter. Thereafter, the peripheral surfaces, and on occasion portions of the horizontal surfaces, of the other layers or tiers are individually frosted and placed upon one another. After the tiers have been placed upon one another, the exposed horizontal surfaces of the cake are frosted and thereafter fanciful frosting designs are applied to the cake.

From the foregoing, it will be appreciated that cake dummies must be considerably more economical than the ingredients of a real cake, must be structurally sound so as to support the cake or the other dummies carried thereby and must be capable of being easily fabricated and handled.

An object of the present invention is to provide pastry dummies meeting the requirements set forth, namely, that the dummies be economical of manufacture and assembly, readily and simply assembled, structurally sound and capable of supporting substantial weight, light in weight, and capable of being readily manpiulated and easily handled.

According to the present invention, we provide pastry dummies consisting of a number of readily assembled parts or elements, which may be furnished in a plurality of sizes, so that cake dummies of various sizes and thicknesses may be readily fabricated or assembled by the bakers to whom the individual parts or elements are supplied. The dummies consist of bottom and top sheets and a plurality of spacers or spacer sheets for insertion between the top and bottom sheets to vary the height or thickness of the completed dummies. The spacers are preferably such that the completed dummies are hollow, light in weight and economical. In addition, the bottom sheet of each dummy is provided with spaced apertures therein so that the fingers of the user may be inserted in the bottom sheet to provide a hand hold by means of which the dummies may be grasped for handling and manipulation.

Other objects and advantages of the present invention will become apparent from the following detailed description of preferred embodiments of the present invention, wherein reference is made to the accompanying drawings, in which:

Figure 1 is a perspective view of a dummy for a tiered wedding cake;

Figure 2 is a vertical cross-sectional view of the tiered cake dummy of Figure 1 in which the bottom and intermediate tiers are fabricated according to one embodiment of the present invention;

Figure 3 is a plan view of one of the bottom sheets of the bottom and intermediate layers or tiers of the cake dummy;

Figure 4 is a plan view of one of the spacer sheets of the bottom and intermediate tiers of the cake dummy;

Figure 5 is a plan view of the top sheet of the bottom and intermediate layers or tiers of the cake dummy of Figure 2;

Figure 6 is a plan view of the bottom sheet of the top tier of the cake dummy of Figure 2, the top tier being fabricated according to a second embodiment of the present invention;

Figure 7 is a plan view of the top sheet of the top tier of the cake dummy of Figure 2;

Figure 8 is a vertical cross-sectional view of one tier of a cake dummy according to another embodiment of the present invention; and Figure 9 is a horizontal cross-sectional view of the cake dummy of Figure 8, taken substantially along the line 9—9 of Figure 8.

The following detailed description and the accompanying drawings are specifically directed to a tiered wedding cake of circular outline. As the description proceeds, it will be apparent that the features of the present invention are equally applicable to other pastry items and to single layer cakes or other types of cakes of any desired configuration. The disclosure of a tiered wedding cake is, therefore, to be taken as exemplary of the invention, and not as a limitation thereof.

Referring to the drawings, the tiered cake dummy shown in Figure 1 comprises a plurality of individual dummies, namely, a bottom tier or layer 10, a number of intermediate tiers or layers 12 and a top tier or layer 14. The tiers 10, 12 and 14 may be formed in a number of ways, and preferred embodiments of the individual tiers are disclosed in the various drawings.

One embodiment of the invention is shown in Figures 2 to 5 inclusive, the embodiment relating particularly to the bottom tier 10 and the intermediate tiers 12. The tiers 10 and 12 are all of identical construction, differing from one another only in size. Each comprises a bottom sheet 16, a top sheet 20 and a plurality of hollow spacers or spacer sheets 22 positioned between the top and bottom sheets. The bottom sheet 16 is provided with a number of apertures or perforations 18, preferably two in number. The apertures 18 are preferably of one inch in diameter and spaced approximately three inches apart for the convenient reception therein of the thumb and second finger of the user of the pastry dummy. In the embodiment of the invention disclosed, the bottom sheet 16 and the top sheet 20 are each in the form of a disc, and the hollow spacers 22 are each annular in shape. It will be appreciated that the pastry dummy of the present invention may be made in any desired shape or configuration, such as square or oval, and therefore the members 22 are referred to herein as hollow spacers.

Each of the tiers 10 and 12 are made up individually to any desired thickness by interposing a desired number of spacers 22 between the bottom sheet 16 and the top sheet 20. The apertures 18 are so positioned in the bottom sheet 16 and the hollow spacers are of such dimensions, that the apertures 18 are not obstructed when the various elements of the dummies are secured together. The sheets 16, 20 and 22 are secured together by means of suitable fasteners 24, such as nails. The fasteners 24 are preferably of a length slightly greater than one-half the thickness of the tier or layer and somewhat less than the thickness of the tier or layer and are driven into the various sheets from both sides, as clearly shown in Figure 2, to secure the sheets together. The sheets could, of course, be glued together, or otherwise secured together, but the preferred fastening means is that shown at 24.

As shown, the bottom and top sheets 16 and 20 of each tier are of the same size and shape, as is usual, and the spacers 22 present an exterior or peripheral configuration corresponding in size and shape to that of the bottom and top sheets. However, the configuration and size of the various sheets may be varied, as desired.

Each tier or layer 10, 12, in actuality, comprises a cake dummy in and of itself. In use, the dummy can be made of any desired size and thickness and is capable of being readily handled and manipulated. The baker, in applying frosting to the dummy grasps the dummy by inserting his thumb and second finger through the apertures 18 in the bottom sheet 16. The fingers of the user pass freely into the hollow of the spacers and the index and other two fingers of the user's hand engage the bottom surface of the bottom sheet 16 to provide a firm support so that the dummy may be readily and conveniently manipulated.

While holding the dummy in one hand, the baker applies frosting to the dummy with a spatula by twisting or rotating the dummy with respect to the frosting laden spatula. If the dummy is a complete cake or is the top tier of a cake, frosting is applied to the peripheral and top surfaces of the dummy. If the dummy is to serve as a bottom or intermediate tier only, the baker usually would apply frosting only to the periphery of the cake, but may frost part of the top if he so desired. When the individual layer or tier has been frosted, the baker sets it down on a flat surface or on top of another tier in a particular manner according to the skills of the baking trade. After the various tiers have been placed on top of one another, the baker may readily apply frosting to the exposed surfaces of the various tiers to effect ornamental designs.

The bottom and top sheets 16 and 20 are preferably formed of corrugated cardboard which is sturdy and lightweight and the spacers 22 may be formed of the same material or ordinary cardboard. The resulting structure is light in weight due to the choice of materials of construction and the material saving design of the spacers, and is strong due to the manner in which the various members are assembled. The structure disclosed is economical of manufacture since a minimum of material is required and the preferred material of construction is relatively economical. Also, when corrugated board is used, the openings at the periphery of the sheets assist in holding the frosting in place.

The construction disclosed in Figures 2 to 5 is not particularly adapted for the formation of cake dummies of small diameter, since the removal of material from the center of the spacers would be an expense without benefit, as will become apparent hereinafter. Accordingly, a further embodiment of the present invention is particularly preferred for fabrication of pastry dummies of small size, the particular embodiment being shown in Figures 2, 6 and 7. As shown in Figure 2, the top tier comprises a bottom sheet 16a, a top sheet 20a and a plurality of spacers, a number of those adjacent the bottom being identical to the sheet 16a, and the remainder of the spacers being the same as the top sheet 20a. The bottom sheet 16a is provided with apertures 18a, in much the same manner as the apertures 18 are provided in the bottom sheet 16 of the previously described embodiment of the invention, with the exception that in the smaller size dummy, the apertures or holes are preferably one-inch in diameter and spaced approximately one-inch apart. To form the tier or dummy, a sufficient number of bottom sheets 16a are piled on top of one another so as to provide adequate space for the insertion of the thumb and second finger of the user into the aligned apertures 18a of the sheets 16a, then enough top sheets or layers 20a are added to build the tier to the desired height or thickness. Thereafter, fasteners 24a are inserted from either side of the tier to secure the various members together, the fasteners being of the same type and size as the fasteners 24 of the embodiment of the invention previously described.

Referring now particularly to Figure 2, it will be noted that the exterior diameter of each tier is exactly equal to the inner diameter or the diameter of the hollow space in the spacers of the tier immediately below. Due to this arrangement, all of the spacers for an entire tiered cake, such as that shown in Figure 2, can be made from the number of cardboard sheets necessary to make up the thickness of only one of the tiers. For example, if ten spacers are required in each tier, ten sheets of cardboard of a size sufficient to provide the spacers for the largest tier are cut in a series of concentric circles, the inner circle providing the spacers for the top tier, the second circle providing the spacers for the second tier, the third circle providing the spacers for the third tier, and so on. Due to this construction, the resultant tiered cake dummy is very economical of manufacture. By providing top and bottom sheets of corrugated cardboard, the lower tiers are of sufficient strength to support the upper tiers.

Referring now to Figures 8 and 9, a further embodiment of the invention is shown wherein different spacer means are provided for spacing the top and bottom sheets apart. In this embodiment of the invention, the bottom sheet 16b is identical to the bottom sheet 16 of the embodiment of the invention first described, and the top sheet 20b is likewise the same as the top sheet 20 previously described. The bottom sheet 16b is provided with apertures 18b and the top sheet 20b and bottom sheet 16b are spaced apart by means of spacers 22b. The spacers 22b consist of wooden blocks or rods of a desired length interposed between the bottom and top sheets 16b and 20b and secured thereto by means of fasteners 24b. The rods or blocks 22b are each of the same length and are pre-cut to desired lengths. The fasteners 24b are preferably less than one-half of the length of the spacers 22b, so that a fastener, such as a nail, can be driven into each rod 22b from either side thereof. A number of spacers 22b are positioned adjacent the periphery of the sheets 16b and 20b and one spacer 22b is positioned at the center of the sheets. As many spacers as desired may be provided and the location thereof is not of particular import so long as the outer periphery of the sheets be adquately supported and the apertures 18b be not obstructed.

To complete the cake dummy, a wall 26b extends between the sheets 16b and 20b adjacent the periphery thereof and conforms to the peripheral configuration thereof. The sheet 26b is preferably flat and is wound around the spaced sheets 16b and 20b and its abutting ends are sealed together by means of a tape 28b. The side wall 26b may be secured to one or both of the sheets 16b and 20b by means of strips of tape or by means of a tape extending around the periphery of the dummy and engaging both the wall 26b and either of the sheets 16b or 20b. One strip of tape is indicated at 29b.

In fabricating a tiered cake dummy, such as that shown in Figure 1, the dummy may be comprised of a plurality of dummy tiers according to Figures 8 and 9, one or more dummy tiers according to Figures 2 and 5, and one or more tiers according to Figures 6 and 7.

As previously stated, the external configuration or appearance of the pastry dummy of the present invention may be varied considerably with respect to that shown in the accompanying drawings. Also, the diameter of the apertures in the bottom sheets 16, 16a and 16b, the spacing thereof and the number thereof, may be varied as desired to meet particular demands.

We have used the words "bottom" and "top" in referring to the various sheets of the cake dummies of the present invention since it is preferred that the sheets be used and assembled as shown and described. It will be appreciated, however, that the individual tier or layer dummies can be inverted without in any way departing from the present invention. Therefore, the words "bottom" and "top," as used in the preceding description and the appended claims, are to be taken as descriptive only, and in a particular sense, as being substantially interchangeable. In other words, the apertures 18 could be provided in the top sheet 20 without departing from the invention. No particular benefit is appreciated in providing apertures in the top sheet, but if believed desirous in any particular instance, the apertures may be provided in the top sheet, the bottom sheet, or in both sheets.

While we have described what we regard to be preferred embodiments of our invention, it will be apparent that various changes, rearrangements and modifications can be made therein without departing from the scope of the invention, as defined by the appended claims.

We claim:

1. For use in simulating a piece of pastry, particularly a layer of cake, a pastry dummy upon which frostings and icings may be applied, comprising a plurality of imperforate sheets, a plurality of sheets each having a pair of spaced apertures therein, said sheets being secured together with said imperforate sheets forming the top and the sheets having the apertures therein forming the bottom of the dummy, the apertures in the bottom sheets being aligned and adapted for the reception of the fingers of a pastryman when the pastryman is applying frosting to the dummy.

2. A pastry dummy comprising a bottom layer, at least one intermediate layer, and a top layer, said bottom layer and each intermediate layer comprising an imperforate top sheet, a bottom sheet having a pair of spaced apertures therein, and a plurality of hollow spacer sheets between said top and bottom sheets retaining the same in spaced parallel relation, said spacer sheets being adapted to support substantial load and defining a peripheral wall and a hollow between said sheets, the outer dimension of the hollow spacer sheets in each intermediate layer being the same as the inner dimension of the hollow spacer sheets in the layer beneath it, said top layer comprising a plurality of upper imperforate sheets and a plurality of lower sheets having aligned spaced apertures therein, the outer dimension of the sheets in said top layer being the same as the inner dimension of the hollow spacer sheets in the layer beneath it, whereby all of said spacer sheets and the sheets of said top layer may be formed together from a plurality of sheets having a size equal to at least the size of the bottom layer, each of said latter sheets yielding a bottom layer spacer, a spacer for each intermediate layer and a sheet of said top layer.

References Cited in the file of this patent

UNITED STATES PATENTS

| Number | Name | Date |
|---|---|---|
| 1,548,237 | Ackerman | Aug. 4, 1925 |
| 1,986,421 | Windfur | Jan. 1, 1935 |
| 2,173,463 | Watts | Sept. 19, 1939 |
| 2,347,041 | Filsinger | Apr. 18, 1944 |